United States Patent [19]

Kaun et al.

[11] 4,011,373
[45] Mar. 8, 1977

[54] UNCHARGED POSITIVE ELECTRODE COMPOSITION

[75] Inventors: Thomas D. Kaun, Lisle; Donald R. Vissers, Naperville; Hiroshi Shimotake, Hinsdale, all of Ill.

[73] Assignee: The United States of America as represented by the United States Energy Research and Development Administration, Washington, D.C.

[22] Filed: Apr. 29, 1976

[21] Appl. No.: 681,649

[52] U.S. Cl. .............................. 429/218; 429/221
[51] Int. Cl.² .................................. H01M 35/02
[58] Field of Search .............. 429/218, 221, 199

[56] References Cited

UNITED STATES PATENTS 3,933,520  1/1976  Gay et al. .................. 429/218 X

Primary Examiner—Anthony Skapars
Attorney, Agent, or Firm—Dean E. Carlson; Arthur A. Churm; Hugh W. Glenn

[57] ABSTRACT

An uncharged positive-electrode composition contains particulate lithium sulfide, another alkali metal or alkaline earth metal compound other than sulfide, e.g., lithium carbide, and a transition metal powder. The composition along with a binder, such as electrolytic salt or a thermosetting resin is applied onto an electrically conductive substrate to form a plaque. The plaque is assembled as a positive electrode within an electrochemical cell opposite to a negative electrode containing a material such as aluminum or silicon for alloying with lithium. During charging, lithium alloy is formed within the negative electrode and transition metal sulfide such as iron sulfide is produced within the positive electrode. Excess negative electrode capacity over that from the transition metal sulfide is provided due to the electrochemical reaction of the other than sulfide alkali metal or alkaline earth metal compound.

7 Claims, 2 Drawing Figures

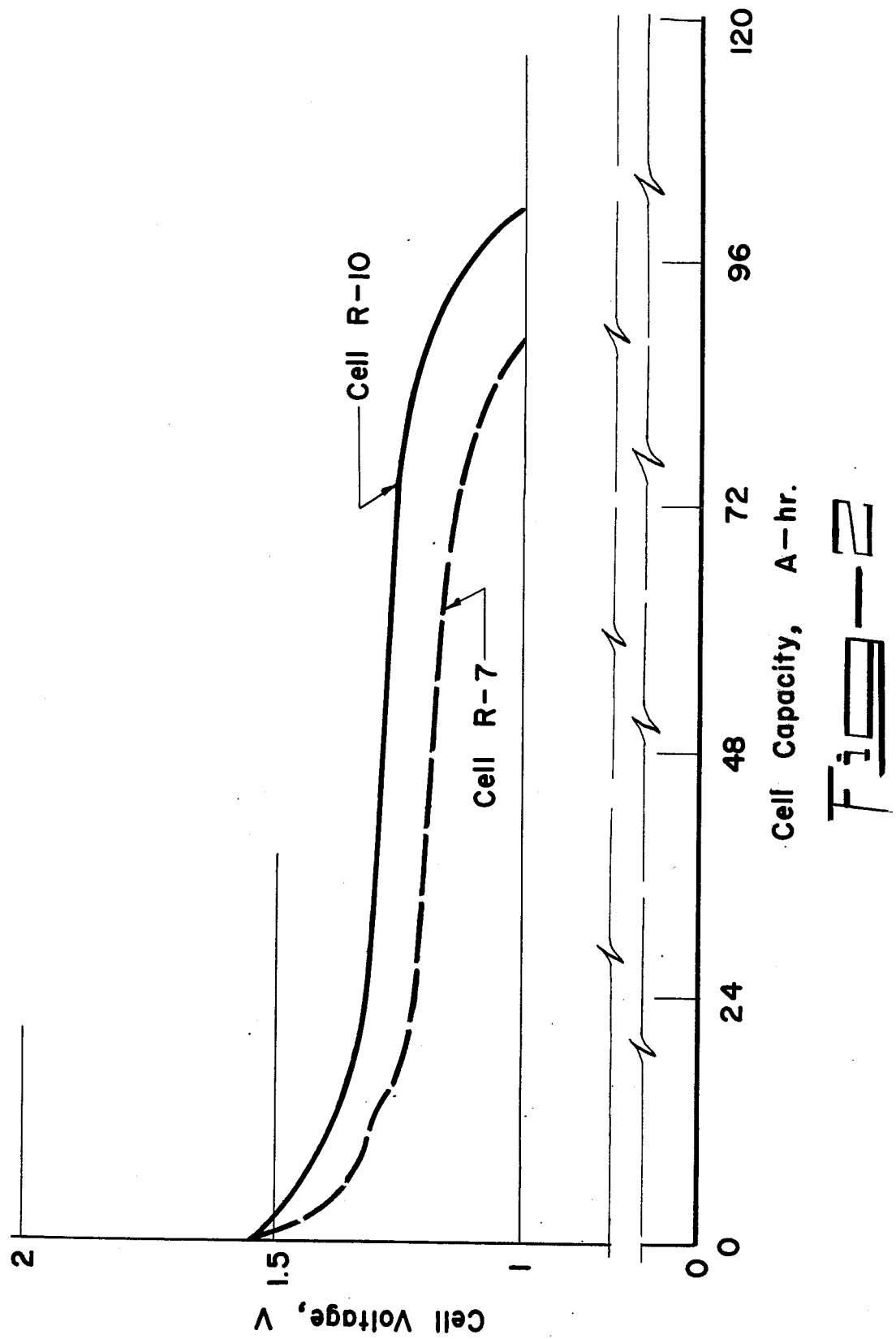

UNCHARGED POSITIVE ELECTRODE COMPOSITION

CONTRACTUAL ORIGIN OF THE INVENTION

The invention described herein was made in the course of, or under, a contract with the U.S. Energy Research and Development Administration.

BACKGROUND OF THE INVENTION

This invention relates to high-temperature, secondary electrochemical cells and batteries of such cells that can be employed as power sources for electric automobiles, storage of energy generated during intervals of off-peak power consumption and various other applications. It is particularly applicable to electrochemical cells that employ metal sulfides as positive electrode active materials and lithium alloys such as lithium-aluminum or lithium-silicon as the negative electrode active material.

A substantial amount of work has been done in development of these types of electrochemical cells and their electrodes. Examples of such high-temperature cells and their various components are disclosed in U.S. Pat. Nos. 3,887,396 to Walsh et al., entitled "Modular Electrochemical Cell," June 3, 1975; 3,907,589 to Bay and Martino, entitled "Cathodes for a Secondary Electrochemical Cell," Sept. 23, 1975; 3,933,520 to Gay and Martino entitled "Method of Preparing Electrodes with Porous Current Collector Structures and Solid Reactants for Secondary Electrochemical Cells," Jan. 20, 1976; and 3,941,612 to Steunenberg et al., entitled "Improved Cathode Composition for Electrochemical Cell," Mar. 2, 1976. The method of the present application is in particular an improvement to that disclosed in allowed U.S. patent application Ser. No. 510,840, now U.S. Pat. No. 3,947,291, to Yao and Walsh, entitled "Electrochemical Cell Assembled in Discharged State," filed Sept. 30, 1974. Each of these patents and patent applications is assigned to the assignee of the present application.

Previous methods for preparing electrochemical cells in uncharged state have been limited in the cell capacity that can be provided in small and light-weight cells. One limiting factor has been the inability to completely discharge lithium-aluminum negative electrodes. A small percentage of the lithium becomes bound within the alloy and is not readily released on discharge of the cell under normal operation. In uncharged cells where the active material is included as the cell reaction product, e.g., lithium sulfide, the positive and negative electrodes will have nearly equal capacities. Additional capacity can be included in the negative electrode by assembling it in a partially charged state. For instance, within a cell in which a 50 atom % lithium and aluminum each is contemplated, the initial lithium electrode composition can include an alloy of about 5 to 10 atom % lithium in, for instance, aluminum. However, in assembling a partially charged cell, certain advantages are lost in that reactive lithium or lithium-aluminum alloy must be handled in an inert gas atmosphere. The completely uncharged cell, on the other hand, can be assembled within a dry air atmosphere.

Therefore, in view of those shortcomings in prior art electrochemical cells, it is an object of the present invention to provide an improved positive electrode composition in the uncharged state.

It is a further object to provide an uncharged positive electrode composition that permits electrochemical charging to form negative electrodes of greater capacity than the positive electrode within the electrochemical cell.

It is also an object to provide an improved uncharged positive electrode composition that can be electrochemically charged to provide an electrochemical cell of increased capacity.

SUMMARY OF THE INVENTION

In accordance with the present invention, an improved uncharged electrode composition is provided for use in the positive electrode of a secondary electrochemical cell. The positive electrode is employed opposite to a negative electrode containing a material capable of alloying with lithium to produce a high melting point alloy that will remain solid at the cell operating temperature. The material within the negative electrode in uncharged state can be such as aluminum or silicon as well as alloys of these materials, e.g., with a transition metal such as nickel. The improved positive electrode composition includes a transition metal, such as iron, nickel, cobalt, cooper, etc., or combinations of these metals, lithium sulfide, and a compound of alkali metal or alkaline earth metal carbide, hydride or nitride. This latter compound is one that can be electrochemically decomposed to deposit the alkali metal or alkaline earth metal within the negative electrode for negative electrode capacity. The preferred compounds are the carbides of lithium and calcium as these are stable at the operating temperatures of cells containing molten salt electrolytes and do not require the venting of nitrogen or hydrogen gas on electrochemical decomposition.

BRIEF DESCRIPTION OF THE DRAWINGS

The present invention is illustrated in the accompanying drawings wherein:

FIG. 2 is a graph showing cell capacity v voltage for two cells, only one of which (R-10) includes the improved positive electrode composition of the present invention.

DETAILED DESCRIPTION OF THE PREFERRED EMBODIMENT

Figure 1:
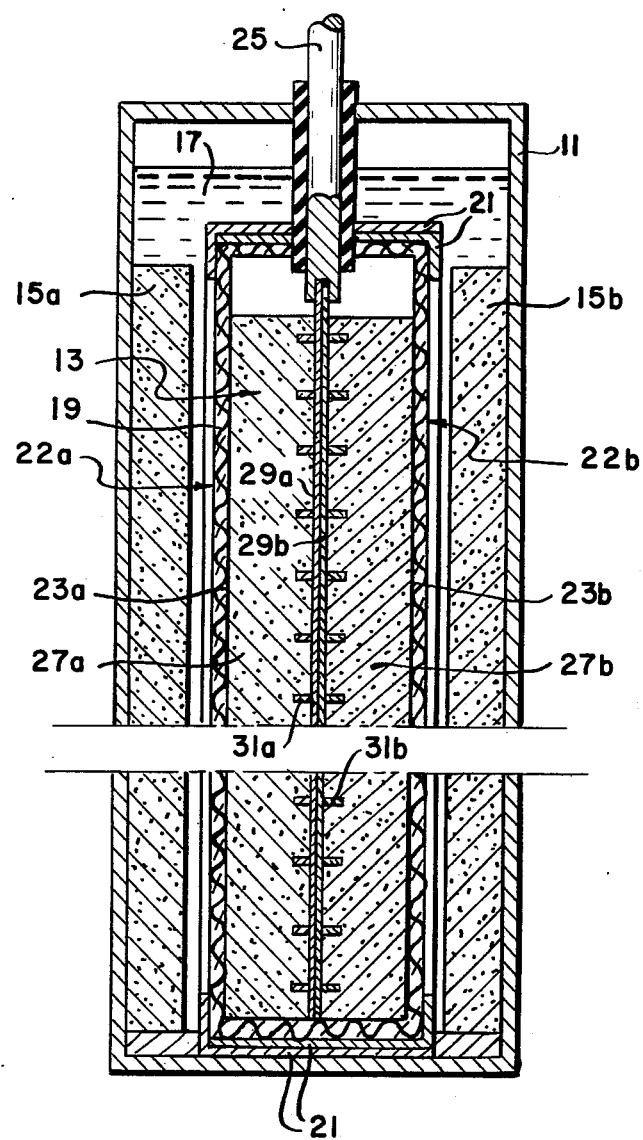
FIG. 1 is a cross-sectional elevation view of an electrochemical cell.

In FIG. 1, an electrochemical cell is shown with vertically arranged electrodes. The electrochemical cell and the electrode preparation described herein are substantially similar to that disclosed in copending patent application Ser. No. 665,746 by Hiroshi Shimotake et al., entitled "Improved Method of Preparing an Electrochemical Cell in Uncharged State," filed Mar. 11, 1976, ERDA case No. S-46,767. The cell is contained within a outer housing 11 containing a centrally located positive electrode 13 between two negative electrodes 15a and 15b. The housing is filled except for space for expansion with liquid electrolyte 17 that permeates a porous electrically insulative fabric 19 between the positive and negative electrodes.

Fabric 19 is held in place by two interlocking frames 21 disposed around the positive electrode 13. Each of the frames 21 are like picture frames in that they circumscribe large, side openings 22a and 22b for exposing the major surfaces 23a and 23b of the positive electrode. The circumscribed side openings can be covered with screen or cloth (not shown) in addition to fabric 19 to insure retention of the positive electrode active material.

Electrical contact for the cell is made to the positive electrode through conductor 25 which insulatively penetrates housing 11 and the interlocking frames 21. Electrical connections to the negative electrodes are made by suitable connections to housing 11.

Negative electrodes 15a and 15b can be provided in a number of forms and by a number of methods. These electrodes can comprise pressed aluminum wires, fibers or particles that contain a stainless steel grid or screen to enhance current collection. As an alternate technique, aluminum or silicon particles can be vibratorily loaded into a metallic foam of nickel or stainless steel as is described in U.S. Pat. No. 3,933,520, cited above. Other negative electrode types can be provided by immersing porous or foamed metal substrates into a metal of aluminum or lithium-aluminum alloy as is described in copending patent application Ser. No. 639,133, filed Dec. 9, 1975 by Tomczuk et al., entitled "A Method of Preparing a Negative Electrode Including Lithium Alloy for Use within a Secondary Electrochemical Cell." These and other techniques are used to provide the negative electrodes 15a and 15b in the uncharged or partially uncharged state. These negative electrodes are porous masses containing aluminum or silicon or other material suitable for alloying with lithium to form a solid negative suitable for alloying with lithium to form a solid negative electrode active material at the cell operating temperature. The electrolyte 17 can be of various ion-containing materials, but for high-temperature high-power electrochemical cells, eutectic and other salt compositions that are molten at the cell operating temperatures are employed. For such cells, temperatures of 375° to about 500° C. are often used. Electrolytic salt compositions of LiCl—KCl or LiCl—LiF—KBr along with various other suitable electrolytes such as those listed in U.S. Pat. No. 3,488,221 have been found to be suitable.

The positive electrode as shown in the figure includes two porous plaques 27a and 27b containing the electrode material, electrolyte and possibly additional current-collecting material. The center of electrode 13 as shown includes two back-to-back, electrically conductive plates 29a and 29b. Each plate includes laterally extending ridges or shelves 31a and 31b of, for instance, metallic mesh for supporting electrode material.

In practice, various other cell and electrode designs may be used with the improved positive electrode composition. The cell of FIG. 1 merely represents an example of the type cell that has been used experimentally to test and prove the operability of such electrodes.

In preparing the positive electrode, the electrode material is selected in its uncharged state. For example, in a cell employing lithium as lithium alloy and ferrous sulfide as the negative and positive electrode materials, respectively, the cell reaction is as follows.

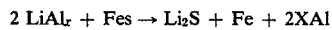

$$2\,LiAl_x + FeS \rightarrow Li_2S + Fe + 2XAl$$

In this instance, the electrode materials to be included in the positive electrode in uncharged state are Fe and $Li_2S$. Aluminum, as explained above, is included in the negative electrode.

In one manner of preparing the improved composition, the positive electrode material along with the electrolytic salt is provided in powdered or particulate form. These materials are blended into a solid mixture at a temperature below the melting point of the salt. The amount of electrolyte can vary between 20 to 35 weight percent, preferably 25–30 weight percent of the total mixture. An amount less than 20 weight percent tends to produce a fragile plaque while amounts in excess of 35 weight percent may be lost during hot pressing.

In this manner of preparing the positive electrode, the particulate mixture of transition metals, lithium sulfide, electrolyte and additives can be applied to a backing or substrate such as one of the two current collector plates 29a and 29b illustrated in FIG. 1. The mixture and plate are pressed at a suitably high pressure, e.g., 2–3 MPa (290–440 psi) while simultaneously heating to a temperature in excess of the melting point of the electrolyte so as to form an integral plaque of the electrode material. A second plaque can be similarly formed and the two welded or otherwise fabricated together in order to form the positive electrode illustrated in FIG. 1.

Other transition metal powders such as nickel, cobalt or copper can be included, either alone or in combination with iron or each other, within the uncharged positive electrode composition. In the usual composition, the total amount of transition metal, e.g., Fe, Ni, Cu, Co, etc., is sufficient to stoichiometrically balanced and react with the included $Li_2S$ to form the desired transition metal sulfide, for example $FeS$, $CuS$, $FeS_2$, $CoS_2$ or combinations of these sulfides.

In the improved positive electrode composition, lithium compounds other than lithium sulfide can be included, for example, lithium carbide, lithium nitride, or lithium hydride. This additive compound provides excess capacity in the form of lithium alloy within the negative electrode on charging the cell. The additive is preferably added in an amount sufficient to provide an excess of 5 to 25 atom percent lithium over that in $Li_2S$. Of these type additives, $Li_2C_2$ is preferred because on electrically charging it produces carbon particles within the positive electrode. These carbon particles will be electrically conductive and serve as current collector materials. The hydrides and nitrides electrochemically decompose to lithium and the corresponding gases which must be vented.

Compounds including other alkali metals than lithium or alkaline earth metals can also be incorporated into the mixture of positive electrode materials. As examples, the carbides, hydrides and nitrides of sodium, potassium, and calcium can be included in amounts that would provide one of these metals in about 5 to 25 atom percent over that of the lithium within the cell. On electrocharging, solid alloys, at the cell operating temperature, of these additives and a negative electrode material such as aluminum can be formed in the negative electrode to provide the desired additional electrochemical capacity.

In one other manner of preparing the improved positive electrode composition, a thermosetting resin along with a volatile material are blended with the additive, transition metal powder and lithium sulfide to form a paste. Both the thermosetting resins and the volatile materials are defined in the copending patent application Ser. No. 636,882, filed Dec. 2, 1975 by Kaun, entitled "Porous Carbonaceous Electrode Structures and Method for Secondary Electrochemical Cell." The thermosetting materials include phenolic, epoxy and furfuryl resins such as phenol-formaldehyde, polymerized furfuryl alcohol or one of the epoxy resins. The volatile is a material that transforms directly from solid to vapor at a defined temperature and includes materials such as ammonium carbonate, ammonium bicarbonate and copper acetyl acetone.

This type positive electrode composition in paste form is spread onto an electrically conductive substrate or sheet such as those illustrated at 29a and 29b in FIG. 1. The paste is heated to a suitably high temperature, e.g., 40° to 200° C. to cure the thermosetting material and transform the volatile to vapor so that the emitted vapors produce porosity within the resin as it cures. The resulting structure is a porous carbon matrix containing the active positive electrode material.

The positive electrode prepared by one of the above techniques is assembled within the electrochemical cell along with negative electrodes containing a material such as aluminum or silicon for alloying with lithium or other alkali metal or alkaline earth metal additive. The cell with added electrolyte is electrically charged to produce a transition metal sulfide such as ferrous sulfide within the positive electrode and a lithium alloy such as lithiumaluminum within the negative electrode. Where carbide additives are used, particulate carbon remains in the positive electrode. the porous carbon matrix structure formed from thermosetting resin is advantageously employed with such carbide additives because the particulate carbon formed during electrochemical charging becomes immobilized as part of the bonded electrode structure. Where a nitride or hydride is employed, nitrogen or hydrogen gas is produced and vented during charging.

The initial and subsequent charges during cell operation are at sufficiently low voltages to prevent formation of free sulfur or metal sulfides of higher potential than desired. In the case of the FeS positive electrode, charge voltages of less than about 1.8 V are used to prevent $FeS_2$ formation with accompanying corrosion of iron current collector and structural components. Dishcarge voltages are maintained at a sufficiently high level, e.g., above 0.8 V for lithium carbide, to prevent reformation of the additive after the initial charge.

The following examples are presented to more clearly illustrate the method of the present invention.

EXAMPLE I

COMPARATIVE EXAMPLE (Cell R-7)

A solid particulate mixture containing 104 g $Li_2S$, 101 g Fe powder, 57 g Cu powder, 112 g LiCl-KCl eutectic were blended at ambient temperature and ground to pass 351 micrometers openings (−42 mesh). The mixture was divided into two parts and each part poured into a die containing an iron backing sheet covered with an attached iron mesh with about 1 cm openings. The die was heated to 360° C. which is above the melting point of the electrolytic salt and the mixture was pressed at approximately 2.8 MPa (400 psig) for 10 minutes while maintaining that temperature. The resulting plaques that were formed were spot welded together at the backing sheets and encased within layers of zirconia and boron nitride cloth. The boron nitride cloth was prewetted with a methyl alcohol solution of LiCl—KCl electrolyte. The assembled plaques were then equipped with an electrode terminal and enclosed within an interlocking frame assembly similar to that illustrated in FIG. 1 at 21.

The negative electrodes were prepared by placing a stainless steel screen between layers of aluminum wire and compacting at about 6.9 MPa (10,000 psig) and 200° C. The cell was assembled in a configuration similar to that shown in FIG. 1. Other characteristics of the cell R-7 are given in Table I.

EXAMPLE II

Lithium Carbide Additive (Cell R-10)

An electrochemical cell similar to that described in Example I was prepared except that the uncharged positive electrode composition included about 112 g $Li_2S$, 26 g $Li_2C_2$, 108 g Fe powder, 62 g Cu powder and 118 g LiCl—KCl. The cell operation at 10 A discharge showed a very high Cell capacity of about 100 A-Hrs at 1 V cutoff which was about 16% greater than that obtained in cell R-7 of Example I. At 20 amps the capacity increase rises to about 26% of R-10 over R-7. These values illustrate the unexpected improvement of increased capacity attributable to the $Li_2C_2$ addition in cell R-10. Further data respecting this cell and that of Example I are shown below in Table I.

TABLE I

| Cell No. | R-7 | | | | R-10 | | | |
|---|---|---|---|---|---|---|---|---|
| Positive Electrode | | | | | | | | |
| Active Material | $Li_2S$-Fe | | | | $Li_2S$ + Fe | | | |
| Additives | Cu powder | | | | $Li_2C_2$ + Cu | | | |
| Electrode Area, $cm^2$ | 278 | | | | 297 | | | |
| Theo. Capacity, A-hr | 121 | | | | 131 | | | |
| Current Collector | Iron sheet | | | | Iron sheet | | | |
| Initial Thickness, cm | 1.08 | | | | 1.37 | | | |
| Negative Electrode | | | | | | | | |
| Material | Al | | | | Al | | | |
| Electrode Area, $cm^2$ | 320 | | | | 323 | | | |
| Theo. Capacity, A-hr | 121 | | | | 150 | | | |
| Current Collector | SS screen | | | | Al wire - SS screen | | | |
| Initial Thickness, cm | 0.26/plaque | | | | 0.87 | | | |
| Test Results | | | | | | | | |
| Charge Cutoff Voltage (IR-free), V | 1.65 | | | | 1.65 | | | |
| Discharge Cutoff Voltage (IR-free), V | 1.0 | | | | 1.0 | | | |
| Discharge Current, A | 5 | 10 | 15 | 20 | 5 | 10 | 20 | 30 |
| Capacity, A-hr | 86 | 84 | 81 | 72 | 101 | 98 | 91 | 81 |
| Utilization, % | 82 | 80 | 77 | 69 | 77 | 75 | 69 | 62 |
| Cell Temp, ° C. | 450 | | | | 450 | | | |
| Charge Current, A | 5 | | | | 10 | | | |
| Ah efficiency, % | 98 | | | | 80–90 | | | |
| Wh Efficiency, | 85 | | | | 82 | | | |
| Cell Resistance, M | 4 | | | | 10 | | | |
| Cell Life | | | | | | | | |

TABLE I-continued

| Cell No. | R-7 | R-10 |
|---|---|---|
| Test Duration, hr | >3200 | >1100 |
| Number of Cycles | >160 | '63 |

EXAMPLE III

Carbon Bonded Electrode (Cell KK-7)

About 380 grams of a paste was prepared including by weight 29% sintered $Li_2S$ particles, 25.5% iron particles, 12% copper particles, 12% $Li_2C_2$ particles, and 21% furfuryl alcohol with suitable acid catalyst and 1.5% ammonium carbonate. The paste was spread in two 5-mm-thick layers on both sides of an iron sheet current collector. A sheet of $ZrO_2$ cloth was placed over both faces. The electrode structure was cured in a helium atmosphere for 6 hours at 100° C. and at about 400° C. for 12 hours in helium under vacuum to ensure removal of all volatiles. The resulting porous carbonaceous matrix included 25% void volume with active electrode material embedded in it. The uncharged positive electrode was now a unified structure and was assembled along with two conventional uncharged negative electrodes to form an uncharged $LiAl/FeS-Cu_2S$ cell. Each uncharged negative electrode was composed of 90 gram pressed Al wire mesh plaque housed in 325 U.S. mesh stainless steel screen faced with $ZrO_2$ cloth. The additional lithium within the lithium carbide is expected to provide sufficient excess negative electrode capacity to increase cell capacity over that provided by a cell having only $Li_2S$ in an uncharged positive electrode composition.

EXAMPLE IV

$FeS_2$—$CoS_2$ Positive Electrode with $Li_2C_2$

The procedure for preparing the positive electrode in Example III was followed except that the paste comprised by weight 22% sintered $Li_2S$ particles, 21% iron particles, 18% $FeS_2$ particles, 8% $CoS_2$ particles, 13% $Li_2C_2$ particles, 5% ammonium carbonate particles, and 14% furfuryl alcohol binder. The paste was spread on a molybdenum sheet current collector for curing and the resulting porous carbonaceous matrix included about 30% void volume. Sufficient lithium is included as $Li_2S$ to discharge the fully charged positive electrode from $FeS_2$ to FeS.

It can be seen from the above examples and description that the present invention provides an improved positive electrode composition. The improved composition includes material in the uncharged state and additional negative electrode material as a carbide. In addition, nitrides or hydrides of an alkali metal such as lithium or an alkaline earth metal can also be used. This additional lithium or other negative electrode material permits the preparation of an electrochemical cell on charging which exhibits an excess of negative electrode capacity to overcome negative electrode deficiencies without adding corresponding positive electrode material to the cell weight.

The embodiments of the invention in which an exclusive property or privilege is claimed are defined as follows:

1. An unchanged electrode composition for use in a positive electrode within a secondary electrochemical cell opposite to a negative electrode containing a material capable of alloying with lithium to produce an alloy of higher melting point than that of lithium metal, said negative electrode material being selected from the group of aluminum and silicon or their ternary alloys, said positive electrode composition comprising a transition metal, lithium sulfide, and a compound selected from alkali metal and alkaline earth metal compounds consisting of the nitrides and carbides.

2. The composition of claim 1 wherein said transition metal is iron.

3. The positive electrode composition of claim 1 being a solid particulate mixture and containing also particles of electrolytic salt including a lithium halide.

4. The positive electrode composition of claim 1 wherein said selected compound is a lithium compound.

5. The positive electrode composition of claim 1 wherein said lithium compound is $Li_2C_2$.

6. The positive electrode composition of claim 4 wherein said lithium within said selected compound is in sufficient amount to provide an excess of 5 to 25 atom percent lithium over that in said lithium sulfide.

7. The positive electrode composition of claim 1 wherein said compound is a hydride, nitride or carbide of sodium, potassium, or calcium included in sufficient amount to provide an excess of 5 to 25 atom percent alkali metal or alkaline earth metal over than in lithium sulfide.

* * * * *

UNITED STATES PATENT OFFICE
CERTIFICATE OF CORRECTION

Patent No. 4,011,373        Dated  March 8, 1977

Inventor(s)  Kaun et al.

It is certified that error appears in the above-identified patent and that said Letters Patent are hereby corrected as shown below:

Column 1, line 26, change "Bay" to --Gay--.

Column 3, lines 29 and 30, after "solid" delete "negative suitable for alloying with lithium to form a solid".

Column 7, Table 1, under "Cell No. R-10" change "63" to -- >63--.

Column 8, claim 1, line 21, change "unchanged" to --uncharged--.
            line 31, after "nitrides" insert --, hydrides--.
         claim 7, line 50, change "than" to --that--.

Signed and Sealed this

*Twenty-first* Day of *August 1979*

[SEAL]

*Attest:*

LUTRELLE F. PARKER
*Attesting Officer*        *Acting Commissioner of Patents and Trademarks*